UNITED STATES PATENT OFFICE.

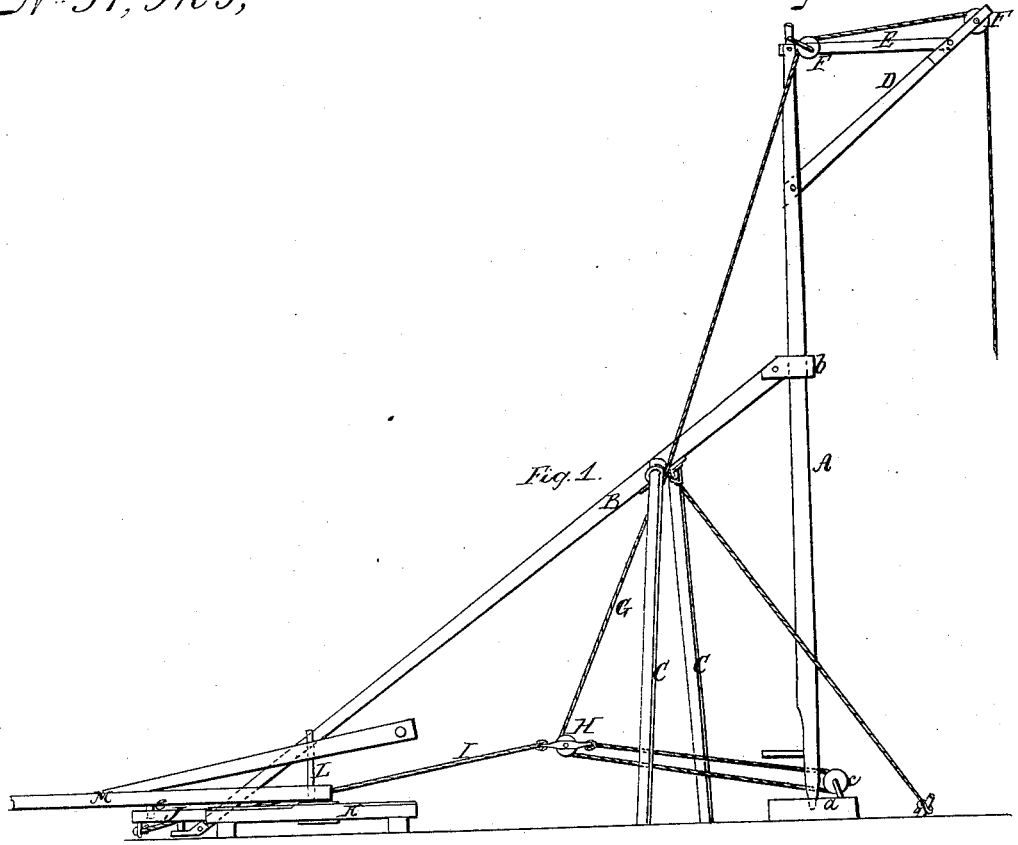
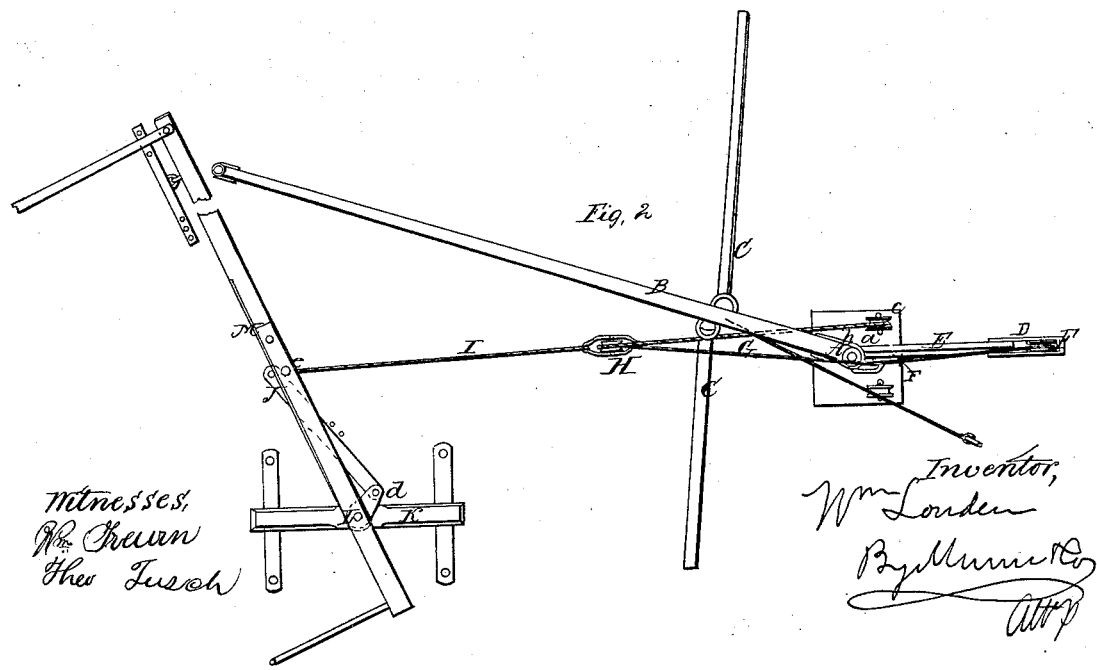

WILLIAM LOUDEN, OF FAIRFIELD, IOWA.

IMPROVEMENT IN HAY-STACKING DEVICES.

Specification forming part of Letters Patent No. 57,525, dated August 28, 1866.

*To all whom it may concern:*

Be it known that I, WILLIAM LOUDEN, of Fairfield, in the county of Jefferson and State of Iowa, have invented a new and Improved Machine for Stacking Hay; and I do hereby declare that the following is a full, clear, and exact description thereof, which will enable those skilled in the art to make and use the same, reference being had to the accompanying drawings, forming part of this specification, in which—

Figure 1 is an elevation of my invention; Fig. 2, a plan or top view of the same.

Similar letters of reference indicate corresponding parts.

This invention relates to a new and improved machine for stacking hay; and it consists in a novel manner of arranging and bracing a crane, and also in a novel arrangement of the sweep mechanism, by which the power of the horse is applied to the tackle which elevates the fork, all being arranged in such a manner that the device may be readily put up and taken down and the loaded fork automatically brought over the stack and automatically released, so that it may descend without backing the horse.

A represents an upright, the lower end of which is fitted in a suitable step, *a*, and is fitted a short distance above the center of its height in a bearing, *b*, which is at the end of an oblique or inclined bar, B, the lower end of which is secured to the ground in any proper manner. The bar B is held in position by two braces, C C, which are at opposite sides of B, and have their lower ends secured to the ground. By this arrangement the upright A is held firmly in position, and at the same time is allowed to turn freely.

To the upper part of the upright A there is attached an oblique arm, D, which is braced by a horizontal arm, E. These arms and the upright constitute a crane, at the upper part of which there are two pulleys, F F, over which a rope, G, passes, the outer end of which has the hay-fork attached. The opposite end of the rope G extends down through a sheave, H, and around a pulley, *c*, on the step *a*, and then extends back and is secured to the strap of sheave H. (See Fig. 1.)

I represents a rope, one end of which is attached to the sheave H and the opposite end to the outer end of an arm, J, the inner end of which is connected by a joint, *d*, to a horizontal bar or fixed piece, K, having a vertical arbor, L, attached, on which the sweep M works. The sweep M has a pendent pin, *e*, attached to it.

The operation is as follows: The horse is attached to the sweep M, and travels around with a continuous movement, there being no retrograde or backward motion. The sweep M, at every revolution, is connected with the arm J in consequence of the pin *e* coming in contact with it, and said arm is turned by the sweep, and the fork consequently elevated from the load over the stack, the crane swinging or turning under the pull of the rope I, so that the fork will, as it ascends, turn from the load over the stack. By the time the fork is fully elevated over the stack and the hay discharged therefrom the pin *e* of the sweep will pass beyond the end of the arm J and liberate said arm, so that the empty fork will descend by its own gravity, and in descending turn so as to fall upon the load, when the fork is again supplied with hay and elevated when the pin *e* comes in contact with the arm J.

Thus, by this simple arrangement, the device may be very readily put up and taken down, the horse allowed to work by a continuous rotary movement, no backing required, and the fork enabled to swing from the load over the stack, and vice versa.

I claim as new and desire to secure by Letters Patent—

1. The bracing of the upright A of the crane by means of the bars or braces B C C, arranged substantially as described.

2. The sweep M, provided with the pendent pin *e*, in connection with the arm J and fork-tackle, all arranged to operate substantially as and for the purpose set forth.

3. The arranging of the crane and tackle relatively with the arm J, and with the stack and load, in such a manner that the fork, in ascending and descending, will, under the pull of the tackle, swing from the load over the stack, and vice versa, substantially as described.

WILLIAM LOUDEN.

Witnesses:
S. W. MCELDERRY,
A. RUSH.